UNITED STATES PATENT OFFICE.

THOMAS M. CARNEGIE, OF PITTSBURG, PENNSYLVANIA.

IMPROVEMENT IN METHODS OF UTILIZING SCRAP STEEL.

Specification forming part of Letters Patent No. 202,517, dated April 16, 1878; application filed February 11, 1878.

*To all whom it may concern:*

Be it known that I, THOMAS M. CARNEGIE, of Pittsburg, in the county of Allegheny and State of Pennsylvania, have invented a new and useful Improvement in Method of Utilizing Scrap Steel; and I do hereby declare the following to be a full, clear, and exact description thereof.

My invention relates to the utilization of scrap steel and similar carburets of iron for the production of homogeneous bar or like product adapted to various uses in the arts; and consists in inclosing scrap steel or similar carburet of iron, together with an oxide of iron, in a practically closed or tight case, heating the same to or above a welding heat, and subsequently rolling, hammering, or otherwise working the mass to weld the whole into a bar.

It is a well-known fact that carburets of iron cannot be reworked to advantage unless incased in a protecting jacket while being reheated, as otherwise the metal will be burned before being raised to the desired temperature for working, giving rise to much loss; therefore, the common method of reworking the carburets is to jacket them, as specified; but the bar obtained from such a steel fagot is in consequence one having a steel center incased by wrought-iron of greater or less thickness.

The object of my invention is not only to utilize steel scrap and similar carburets, but to obtain a homogeneous product partaking of the nature of a low carburet closely allied to wrought-iron.

I will now proceed to describe my invention, so that others skilled in the art to which it appertains may apply the same.

In carrying out my invention I provide a suitable jacket or case—preferably of light wrought iron—and pack therein the carburet in the form of steel scrap, steel-rail ends, or like material. I then mix therewith, so as to fill the interstices between the scrap, and scrap and case, an oxide of iron, such as iron ore, mill-scale from either rolls or hammer, or any other form of oxide of iron, or several of such oxides, if desired, finally closing the case in such manner as to render it practically tight. The case and contents are placed in a suitable furnace and heated to or above the welding heat, after which they are removed and submitted to the rolls or hammer to be drawn into bars, plates, &c.

The proportions of the oxide to the scrap will of course vary, but can be readily determined by the skilled workman, who will be guided, first, by the nature of the carburet or amount of combined carbon in the scrap; and, secondly, by the amount of combined carbon (be it more or less) desired in the product.

The advantages of my invention are, first, that steel scrap can be readily worked and converted into a homogeneous metal allied to wrought-iron without waste or loss of stock; and, secondly, the quality of the product can be controlled and predetermined.

I am aware that scrap steel has been heretofore reworked by jacketing or incasing it in a protecting case, and a steel-centered bar thus produced.

I am aware that high grade steel plates for boiler and similar uses have been inclosed in a case, together with decarbonizing agents, such as a metallic oxide, and subjected to what may be termed a "cementation process," to obtain lower-grade steel boiler-plate.

I am also aware that molds or tubes have been charged with ore and carbon, then subjected to such heat as would reduce the ore, and, finally, have been melted and worked up to produce steel, the same being a species of direct process for the manufacture of steel; and I am also aware that in the last-recited process it has been suggested that all sorts of scraps of iron, wrought-iron, and steel may be mixed in the mold in said process of manufacturing steel, each and all of which processes I distinctly disclaim; but,

Having thus described my invention, what I claim, and desire to secure by Letters Patent, is—

The method herein described for converting carburets of iron into homogeneous bar, the same consisting in inclosing the carburet of iron, together with an oxide of iron, in a practically tight wrought-iron case, heating the same to a welding heat or above, as with fagots, and rolling or hammering the mass, substantially as specified.

In testimony whereof I, the said THOMAS M. CARNEGIE, have hereunto set my hand.

THOMAS M. CARNEGIE.

Witnesses:
JAMES I. KAY,
F. W. RITTER, Jr.